(12) United States Patent
Reul et al.

(10) Patent No.: US 8,816,215 B2
(45) Date of Patent: *Aug. 26, 2014

(54) DISK WITH AN ELECTRICAL CONNECTION ELEMENT

(75) Inventors: Bernhard Reul, Herzogenrath (DE); Mitja Rateiczak, Wuerselen (DE); Stefan Ziegler, Aachen (DE); Andreas Schlarb, Herzogenrath (DE)

(73) Assignee: Saint-Gobain Glass France (FR)

( * ) Notice: Subject to any disclaimer, the term of this patent is extended or adjusted under 35 U.S.C. 154(b) by 142 days.

This patent is subject to a terminal disclaimer.

(21) Appl. No.: 13/580,741

(22) PCT Filed: Feb. 15, 2011

(86) PCT No.: PCT/EP2011/052195
§ 371 (c)(1),
(2), (4) Date: Aug. 23, 2012

(87) PCT Pub. No.: WO2011/107341
PCT Pub. Date: Sep. 9, 2011

(65) Prior Publication Data
US 2012/0318566 A1    Dec. 20, 2012

(30) Foreign Application Priority Data
Mar. 2, 2010  (EP) .................................... 10155181

(51) Int. Cl.
| | |
|---|---|
| H05K 1/03 | (2006.01) |
| H05K 1/09 | (2006.01) |
| B32B 15/01 | (2006.01) |
| H05B 3/84 | (2006.01) |
| B23K 35/26 | (2006.01) |
| C22C 12/00 | (2006.01) |
| C22C 13/00 | (2006.01) |
| C22C 38/10 | (2006.01) |
| C22C 38/08 | (2006.01) |
| H01R 13/03 | (2006.01) |
| H01R 4/02 | (2006.01) |

(52) U.S. Cl.
CPC .............. *H05B 3/84* (2013.01); *H01R 2201/26* (2013.01); *H05B 2203/016* (2013.01); *B32B 15/018* (2013.01); *B23K 35/264* (2013.01); *H01R 13/03* (2013.01); *H01R 2201/02* (2013.01); *H01R 4/028* (2013.01); *C22C 12/00* (2013.01); *B23K 35/262* (2013.01); *C22C 13/00* (2013.01); *C22C 38/10* (2013.01); *C22C 38/08* (2013.01)
USPC ......................................... 174/256; 174/259

(58) Field of Classification Search
CPC .. B23K 35/262; B23K 35/264; B32B 15/018; C22C 12/00; C22C 13/00; C22C 38/08; C22C 38/10; H01R 13/03; H01R 2201/02; H01R 2201/26; H01R 4/028; H05B 2203/016; H05B 3/84
USPC ................... 361/777, 760; 174/255–263, 546
See application file for complete search history.

(56) References Cited

U.S. PATENT DOCUMENTS 2,709,211 A    5/1955    Glynn
(Continued)

FOREIGN PATENT DOCUMENTS

DE    1936780    2/1970
(Continued)

OTHER PUBLICATIONS

PCT International Search Report for PCT/EP2011/052195 filed on Feb. 15, 2011 in the name of Saint-Gobain Glass France (German and English).

(Continued)

*Primary Examiner* — Yuriy Semenenko
(74) *Attorney, Agent, or Firm* — Steinfl & Bruno LLP

(57) ABSTRACT

The present invention relates to a disk with an electrical connection element, having a substrate with a first coefficient of thermal expansion, an electrically conductive structure on a region of the substrate, and a connection element with a second coefficient of thermal expansion.

18 Claims, 5 Drawing Sheets

(56) References Cited

U.S. PATENT DOCUMENTS

| | | | |
|---|---|---|---|
| 3,484,584 A | | 12/1969 | Shaw, Jr. et al. |
| 6,406,337 B1* | | 6/2002 | Machado ..................... 439/876 |
| 6,787,700 B2 | | 9/2004 | Nagao et al. |
| 7,974,104 B2 | | 7/2011 | Kitada et al. |
| 2003/0073349 A1* | | 4/2003 | Nagao et al. ................. 439/620 |
| 2005/0029666 A1* | | 2/2005 | Kurihara et al. ............. 257/772 |
| 2006/0228953 A1* | | 10/2006 | Pereira et al. ................ 439/876 |
| 2007/0031279 A1* | | 2/2007 | Soga et al. ................... 420/470 |
| 2007/0105412 A1* | | 5/2007 | Hoepfner et al. ............... 439/83 |
| 2007/0224842 A1 | | 9/2007 | Hoepfner et al. |
| 2009/0277671 A1 | | 11/2009 | Hahn |
| 2012/0298416 A1* | | 11/2012 | Ziegler et al. ............... 174/75 R |
| 2013/0043066 A1 | | 2/2013 | Cholewa et al. |

FOREIGN PATENT DOCUMENTS

| | | |
|---|---|---|
| DE | 102006017675 | 10/2007 |
| EP | 0488878 | 6/1992 |
| EP | 0720253 | 7/1996 |
| EP | 0848449 | 6/1998 |
| EP | 1488972 | 12/2004 |
| EP | 1942703 | 1/2008 |
| EP | 1942703 | 7/2008 |
| FR | 1104595 | 11/1995 |
| GB | 751536 | 6/1956 |
| WO | 98/47200 | 10/1998 |

OTHER PUBLICATIONS

PCT International Search Report for PCT/EP2011/052196 filed on Feb. 15, 2011 in the name of Saint-Gobain Glass France (German and English).

PCT Written Opinion mailed on May 12, 2012 for PCT/EP2011/052195 filed on Feb. 15, 2011 in the name of Saint-Gobain Glass France (German and English).

PCT International Preliminary Report on Patentability mailed on Sep. 25, 2012 for PCT/EP2011/052195 filed on Feb. 15, 2011 in the name of Saint-Gobain Glass France (German and English).

PCT Written Opinion mailed on May 17, 2012 for PCT/EP2011/052196 filed on Feb. 15, 2011 in the name of Saint-Gobain Glass France (German and English).

PCT International Preliminary Report on Patentability mailed on Sep. 25, 2012 for PCT/EP2011/052196 filed on Feb. 15, 2011 in the name of Saint-Gobain Glass France (German and English).

Non-Final Office Action mailed on Mar. 7, 2014 for U.S. Appl. No. 13/575,566 filed Jul. 26, 2012 in the name of Stefan Ziegler et al.

International Search Report mailed on Sep. 26, 2011 for International Application No. PCT/EP2011/061195 filed on Jul. 4, 2011 in the name of Saint-Gobain Glass France (English Translation + German Original).

Written Opinion mailed on Sep. 26, 2011 for International Application No. PCT/EP2011/061195 filed on Jul. 4, 2011 in the name of Saint-Gobain Glass France (English Translation + German Original).

International Preliminary Report on Patentability issued on Jan. 15, 2013 for International Application No. PCT/EP2011/061195 filed on Jul. 4, 2011 in the name of Saint-Gobain Glass France (English Translation + German Original).

* cited by examiner

DISK WITH AN ELECTRICAL CONNECTION ELEMENT

CROSS REFERENCE TO RELATED APPLICATIONS

The present application is the US national stage of International Application PCT/EP2011/052195 filed on Feb. 15, 2011, which in turn, claims priority to European Patent Application No. 10155181.0 filed on Mar. 2, 2010. The present application is also related to U.S. patent application Ser. No. 13/575,566 filed on Jul. 26, 2012, which is the US national stage of International Application PCT/EP2011/052196 filed on Feb. 15, 2011, which in turn, claims priority to European Patent Application No. 10155181.0 filed on Mar. 2, 2010.

BACKGROUND

The invention relates to a pane with an electrical connection element and an economical and environmentally friendly method for its manufacture.

FIELD OF INVENTION

The invention further relates to a pane with an electrical connection element for motor vehicles with electrically conductive structures such as, for instance, heating conductors or antenna conductors. The electrically conductive structures are customarily connected to the on-board electrical system via soldered-on electrical connection elements. Due to different coefficients of thermal expansion of the materials used, mechanical stresses occur that strain the panes and can cause breakage of the pane during manufacture and operation.

Lead-containing solders have high ductility that can compensate the mechanical stresses occurring between an electrical connection element and the pane by plastic deformation. However, because of the End of Life Vehicles Directive 2000/53/EC, lead-containing solders have to be replaced by lead-free solders within the EC. The directive is referred to, in summary, by the acronym ELV (End of Life Vehicles). The objective is to ban extremely problematic components from products resulting from the massive increase in disposable electronics. The substances affected are lead, mercury, cadmium, and chromium. This relates, among other things, to the implementation of lead-free soldering materials in electrical applications on glass and the introduction of corresponding replacement products.

EP 1 942 703 A2 discloses an electrical connection element on panes of motor vehicles, wherein the difference in the coefficient of thermal expansion of the pane and the electrical connection element is $<5\times10^{-6}/°$ C. In order to enable adequate mechanical stability and processability, it is proposed to use an excess of solder material. The excess of solder material flows out from the intermediate space between the connection element and the electrically conductive structure. The excess of solder material causes high mechanical stresses in the glass pane. These mechanical stresses ultimately result in breakage of the pane.

SUMMARY

The object of the present invention is to provide a pane with an electrical connection element and an economical and environmentally friendly method for its manufacture, whereby critical mechanical stresses in the pane are avoided.

The object of the present invention is accomplished through a pane with a connection element that comprises the following characteristics:
- a substrate made of glass (1) with a first coefficient of thermal expansion,
- an electrically conductive structure (2) with a layer thickness of 5 μm to 40 μm, preferably 5 μm to 20 μm, on a region of the substrate (1),
- a connection element (3) with a second coefficient of thermal expansion, whereby the difference between the first and the second coefficient of expansion is $\geq 5\times10^{-6}/°$ C., and
- a layer of a soldering material (4), which electrically connects the connection element (3) to subregions of the electrically conductive structure (2).

An electrically conductive structure is applied on the pane. An electrical connection element is electrically connected by a soldering material on subregions to the electrically conductive structure. The solder material flows out with an outflow width of <1 mm from the intermediate space between the connection element and the electrically conductive structure.

In a preferred embodiment, the maximum outflow width is preferably less than 0.5 mm and, in particular, roughly 0 mm. The maximum outflow width can even be negative, i.e., pulled back into the intermediate space formed by an electrical connection element and an electrically conductive structure, preferably in a concave meniscus.

The maximum outflow width is defined as the distance between the outer edges of the connection element and the point of the solder material crossover, at which the solder material drops below a layer thickness of 50 μm.

The advantage resides in the reduction of mechanical stresses in the pane, in particular, in the critical region present with a large solder material crossover.

The first coefficient of thermal expansion is preferably from $8\times10^{-6}/°$ C. to $9\times10^{-6}/°$ C. The substrate is preferably glass that has, preferably, a coefficient of thermal expansion from $8.3\times10^{-6}/°$ C. to $9\times10^{-6}/°$ C. in a temperature range from 0° C. to 300° C.

The second coefficient of thermal expansion is preferably from $8\times10^{-6}/°$ C. to $9\times10^{-6}/°$ C., particularly preferably from $8.3\times10^{-6}/°$ C. to $9\times10^{-6}/°$ C. in a temperature range from 0° C. to 300° C.

The coefficient of thermal expansion of the connection element can be $\leq 4\times10^{-6}/°$ C.

The electrically conductive structure according to the invention has, preferably, a layer thickness of 8 μm to 15 μm, particularly preferably from 10 μm to 12 μm. The electrically conductive structure according to the invention contains, preferably, silver, particularly preferably silver particles and glass frits.

The layer thickness of the solder according to the invention is $<3.0\times10^{-4}$ m. The solder material according to the invention contains, preferably, tin and bismuth, indium, zinc, copper, silver, or compositions thereof. The proportion of tin in the solder composition according to the invention is from 3 wt.-% to 99.5 wt.-%, preferably from 10 wt.-% to 95.5 wt.-%, particularly preferably from 15 wt.-% to 60 wt.-%. The proportion of bismuth, indium, zinc, copper, silver, or compositions thereof in the solder composition according to the invention is from 0.5 wt.-% to 97 wt.-%, preferably 10 wt.-% to 67 wt.-%, whereby the proportion of bismuth, indium, zinc, copper, or silver can be 0 wt.-%. The solder composition according to the invention can contain nickel, germanium, aluminum, or phosphorus at a proportion of 0 wt.-% to 5 wt.-%. The solder composition according to the invention contains, very particularly preferably, Bi40Sn57Ag3, Sn40Bi57Ag3, Bi59Sn40Ag1, Bi57Sn42Ag1, In97Ag3, Sn95.5Ag3.8Cu0.7, Bi67In33, Bi33In50Sn17, Sn77.2In20Ag2.8, Sn95Ag4Cu1, SN99Cu1, Sn96.5Ag3.5, or mixtures thereof.

The connection element according to the invention contains preferably at least 50 wt.-% to 75 wt.-% iron, 25 wt.-% to 50 wt.-% nickel, 0 wt.-% to 20 wt.-% cobalt, 0 wt.-% to 1.5 wt.-% magnesium, 0 wt.-% to 1 wt.-% silicon, 0 wt.-% to 1 wt.-% carbon, or 0 wt.-% to 1 wt.-% manganese.

The connection element according to the invention contains preferably chromium, niobium, aluminum, vanadium, tungsten, and titanium at a proportion of 0 wt.-% to 1 wt.-%, molybdenum at a proportion of 0 wt.-% to 5 wt.-%, as well as production-related admixtures.

The connection element according to the invention contains preferably at least 55 wt.-% to 70 wt.-% iron, 30 wt.-% to 45 wt.-% nickel, 0 wt.-% to 5 wt.-% cobalt, 0 wt.-% to 1 wt.-% magnesium, 0 wt.-% to 1 wt.-% silicon, or 0 wt.-% to 1 wt.-% carbon.

The connection element according to the invention further contains preferably at least 50 wt.-% to 60 wt.-% iron, 25 wt.-% to 35 wt.-% nickel, 15 wt.-% to 20 wt.-% cobalt, 0 wt.-% to 0.5 wt.-% silicon, 0 wt.-% to 0.1 wt.-% carbon, or 0 wt.-% to 0.5 wt.-% manganese.

The connection element according to the invention is coated, particularly preferably, with nickel, tin, copper and/or silver. The connection element according to the invention is coated, very particularly preferably, with 0.1 μm to 0.3 μm nickel and/or 3 μm to 10 μm silver. The connection element can be plated with nickel, tin, copper, and/or silver. Ni and Ag improve the current carrying capacity and corrosion stability of the connection element and the wetting with the solder material.

The connection element according to the invention contains preferably kovar (FeCoNi) and/or invar (FeNi) with a coefficient of thermal expansion of invar from $0.1 \times 10^{-6}/°$ C. to $4 \times 10^{-6}/°$ C. or a maximum difference of kovar of $5 \times 10^{-6}/°$ C. from the coefficient of expansion of the pane.

Kovar is an iron-nickel-cobalt alloy that has a coefficient of thermal expansion of usually roughly $5 \times 10^{-6}/°$ C., which is thus less than the coefficient of typical metals. The composition contains, for example, 54 wt.-% iron, 29 wt.-% nickel, and 17 wt.-% cobalt. In the area of microelectronic and microsystem technology, kovar is, consequently, used as a housing material or as a submount. Submounts lie, according to the sandwich principle, between the actual substrate material and the material with, for the most part, a clearly higher coefficient of expansion. Kovar thus serves as a compensating element which absorbs and reduces the thermo-mechanical stresses caused by the different coefficients of thermal expansion of the other materials. Similarly, kovar is used for metal-glass implementations of electronic components, material transitions in vacuum chambers.

Invar is an iron-nickel alloy with a content of 36 wt.-% nickel (FeNi36). There is a group of alloys and compounds that have the property of having abnormally small or sometimes negative coefficients of thermal expansion in certain temperature ranges. Fe65Ni35 invar contains 65 wt.-% iron and 35 wt.-% nickel. Up to 1 wt.-% magnesium, silicon, and carbon are usually alloyed to change the mechanical properties. By alloying 5 wt.-% cobalt, the coefficient of thermal expansion α can be further reduced. One name for the alloy is Inovco, FeNi33Co4.5 with an coefficient of expansion α (20° C. to 100° C.) of $0.55 \times 10^{-6}/°$ C.

If an alloy such as invar with a very low absolute coefficient of thermal expansion of $<4 \times 10^{6}/°$ C. is used, overcompensation of mechanical stresses occurs by noncritical pressure stresses in the glass or by noncritical tensile stresses in the alloy. Because of the overcompensation of the alloy, the outflow width from the intermediate space between the connection element and the electrically conductive structure is negligible.

Kovar and/or invar can also be welded, crimped, or glued as a compensation plate on a connection element made, for example, of steel, aluminum, titanium, copper. As a bimetal, favorable expansion behavior of the connection element relative to the glass expansion can be obtained. The compensation plate is preferably hat-shaped.

The electrical connection element contains, on the surface facing the solder material, a coating that contains copper, zinc, tin, silver, gold, or a combination thereof, preferably silver. This prevents a spreading of the solder material out beyond the coating and limits the outflow width.

The electrical connection element can be designed in the form of a bridge with at least two contact surfaces, but also as a connection element with one contact surface.

The connection elements are, in the plan view, for example, preferably 1 mm to 50 mm long and wide and, particularly preferably 3 mm to 30 mm long and wide and, very particularly preferably 2 mm to 4 mm wide and 12 mm to 24 mm long.

The shape of the electrical connection element can form solder depots in the intermediate space of the connection element and the electrically conductive structure. The solder depots and wetting properties of the solder on the connection element prevent the outflow of the solder material from the intermediate space. The solder depots can be rectangular, rounded, or polygonal in design.

The distribution of the soldering heat and, thus, the distribution of the solder material during the soldering process can be defined by the shape of the connection element. Solder material flows to the warmest point. For example, the bridge can have a single or double hat shape in order to distribute the heat advantageously in the connection element during the soldering process.

The introduction of the energy during the electrical connecting of an electrical connection and an electrically conductive structure occurs preferably by means of punches, thermodes, piston soldering, preferably laser soldering, hot air soldering, induction soldering, resistance soldering, and/or with ultrasound.

The object of the invention is further accomplished through a method of manufacture of a pane with a connection element, wherein a) solder material is arranged and applied on the connection element as a platelet with a fixed layer thickness, volume, shape, and arrangement, b) an electrically conductive structure is applied to a substrate, c) the connection element with the solder material is arranged on the electrically conductive structure, and d) the connection element is soldered with the electrically conductive structure.

The solder material is preferably applied in advance to the connection elements, preferably as a platelet with a fixed layer thickness, volume, shape, and arrangement on the connection element.

The connection element is welded or crimped to a sheet, braided wire, mesh (not shown) made, for example, of copper and connected to the on-board electrical system (also not shown).

The connection element is preferably used in heated panes or in panes with antennas in buildings, in particular, in automobiles, railroads, aircraft, or watercraft. The connection element serves to connect the conducting structures of the pane to electrical systems that are arranged outside the pane. The electrical systems are amplifiers, control units, or voltage sources.

BRIEF DESCRIPTION OF THE DRAWINGS

The invention is explained in detail with reference to drawings and exemplary embodiments. They depict.

DETAILED DESCRIPTION

Figure 1:
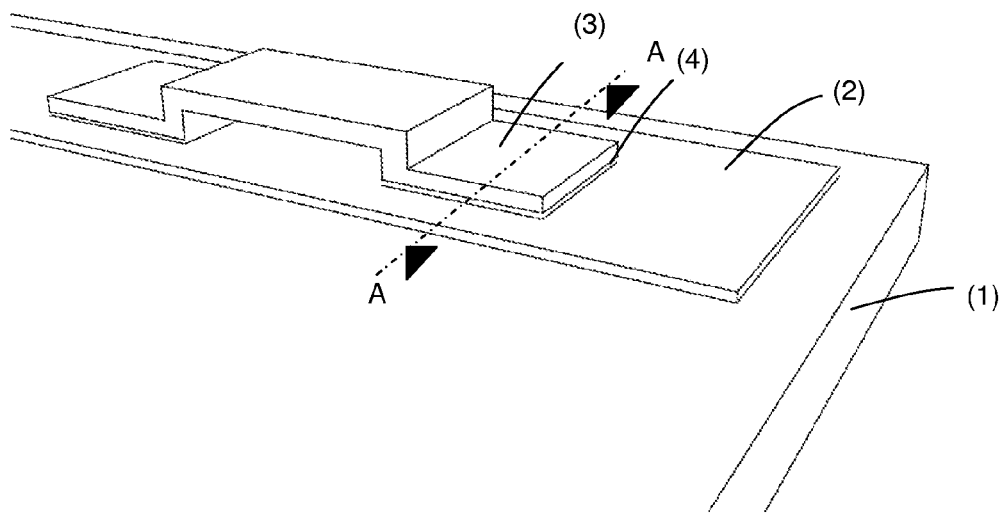
FIG. 1 a perspective view of a first embodiment of the pane according to the invention, FIG. 2 a cross-section A-A through the pane of FIG. 1, FIG. 3 a cross-section through an alternative pane according to the invention, FIG. 4 a cross-section through another alternative pane according to the invention, FIG. 5 a cross-section through another alternative pane according to the invention, FIG. 6 a perspective view of an alternative embodiment of the pane according to the invention, FIG. 7 a cross-section B-B through the pane of FIG. 6, and FIG. 8 a detailed flow chart of the method according to the invention.
Figure 2:
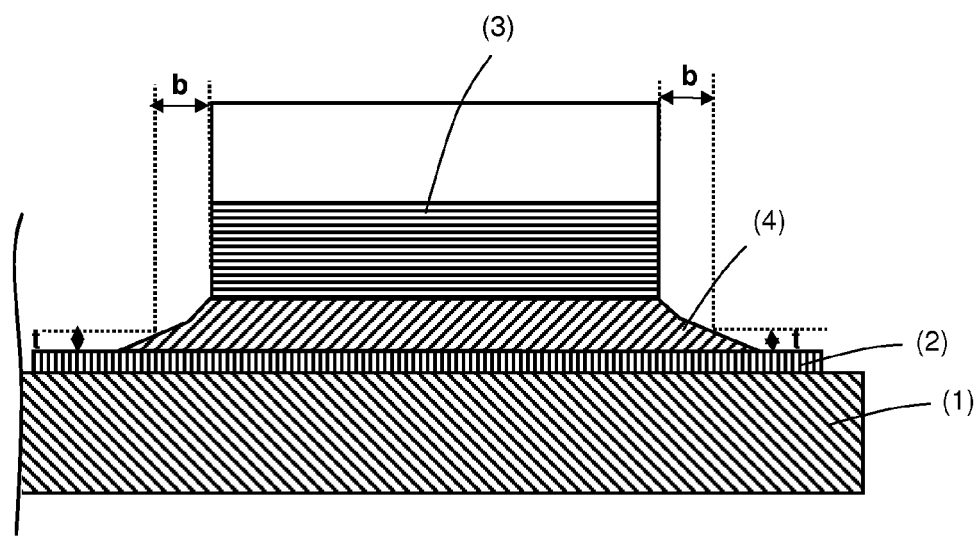

FIG. 1 and FIG. 2 show, in each case, a detail of a heatable pane 1 according to the invention in the region of the electrical connection element 3. The pane 1 was a 3-mm-thick thermally prestressed single-pane safety glass made of soda lime glass. The pane 1 had a width of 150 cm and a height of 80 cm. An electrically conductive structure 2 in the form of a heating conductor structure 2 was printed on the pane 1. The electrically conductive structure 2 contained silver particles and glass frits. In the edge region of the pane 1, the electrically conductive structure 2 was widened to a width of 10 mm and formed a contact surface for the electrical connection element 3. In the edge region of the pane 1, there was also a covering serigraph (not shown). In the region of the contact surface between the electrical connection element 3 and the electrically conductive structure 2, solder material was applied, which effected a durable electrical and mechanical connection between the electrical connection element 3 and the electrically conductive structure 2. The solder material 4 contained wt.-% bismuth, 42 wt.-% tin, and 1 wt.-% silver. The solder material 4 was arranged through a predefined volume and shape completely between the electrical connection element 3 and the electrically conductive structure 2. The solder material 4 had a thickness of 250 µm. An outflow of the solder material 4 from the intermediate space between the electrical connection element 3 and the electrically conductive structure 2, which exceeds a layer thickness t of 50 µm, was observed to a maximum outflow width of b=0.5 mm. The electrical connection element 3 was an alloy that contained 65 wt.-% iron and 35 wt.-% nickel. The electrical connection element 3 was designed in the form of the bridge and had a width of 4 mm and a length of 24 mm. The material thickness of the connection element 3 was 0.8 mm. The contact surface of the connection element 3 had a width of 4 mm and a length of 4 mm. No critical mechanical stresses were observed in the pane 1 due to the arrangement of the solder material 4, predefined by the connection element 3 and the electrically conductive structure 2. The connection of the pane 1 to the electrical connection element 3 via the electrically conductive structure 2 was durably stable.

Figure 3:
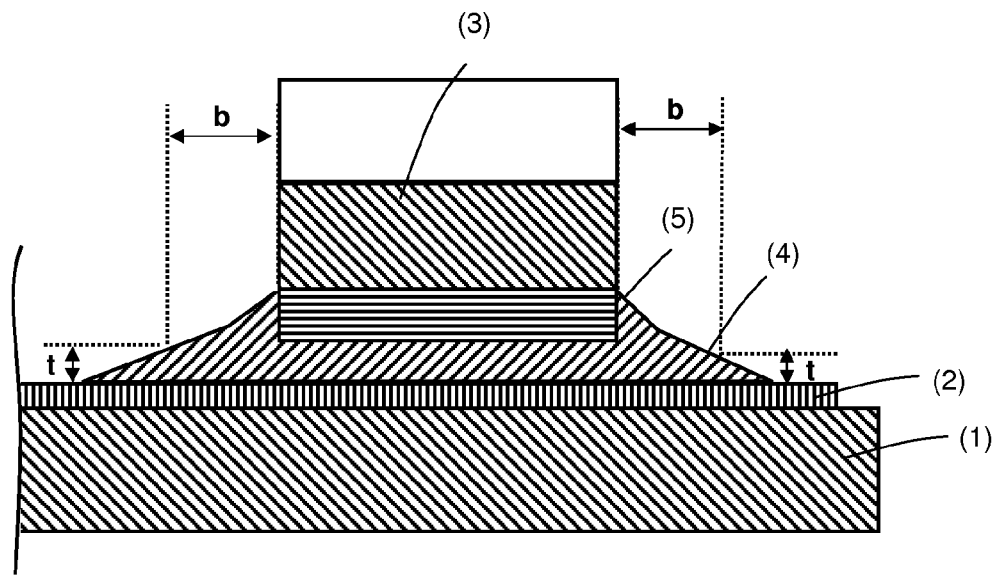

FIG. 3 depicts, in continuation of the exemplary embodiment of FIGS. 1 and 2, an alternative embodiment of the connection element 3 according to the invention. The electrical connection element 3 was provided on the surface facing the solder material 4 with a silver-containing coating 5. This prevented spreading of the solder material out beyond the coating 5 and limited the outflow width b. The outflow width b of the solder material 4 was less than 1 mm. No critical mechanical stresses were observed in the pane 1 due to the arrangement of the solder material 4. The connection of the pane 1 to the electrical connection element 3 via the electrically conductive structure 2 was durably stable.

Figure 4:
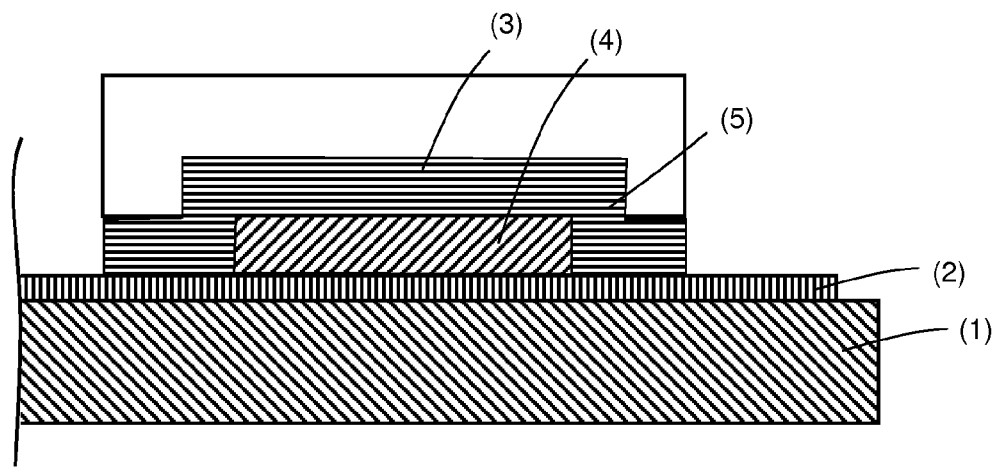

FIG. 4 depicts, in continuation of the exemplary embodiment of FIGS. 1 and 2, another alternative embodiment of the connection element 3 according to the invention. The electrical connection element 3 contained, on the surface facing the solder material 4, a recess with a depth of 250 µm that formed a solder depot for the solder material 4. It was possible to completely prevent outflow of the solder material 4 from the intermediate space. The thermal stresses in the pane 1 were noncritical and a durable electrical and mechanical connection was provided between the connection element 3 and the pane 1 via the electrically conductive structure 2.

Figure 5:
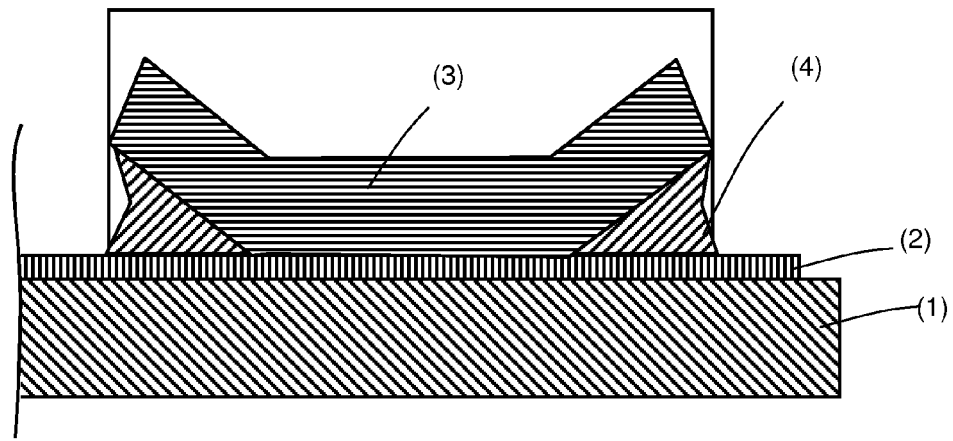

FIG. 5 depicts, in continuation of the exemplary embodiment of FIGS. 1 and 2, another alternative embodiment of the connection element 3 according to the invention. The electrical connection element 3 was bent upward on the edge regions. The height of the upward bend of the edge region of the glass pane 1 was a maximum of 400 µm. This formed a space for the solder material 4. The predefined solder material 4 formed a concave meniscus between the electrical connection element 3 and the electrically conductive structure 2. It was possible to completely prevent outflow of solder material 4 from the intermediate space. The outflow width b, at roughly 0, was less than zero, largely because of the meniscus formed. The thermal stresses in the pane 1 were noncritical, and a durable electrical and mechanical connection was provided between the connection element 3 and the pane 1 via the electrically conductive structure 2.

Figure 6:
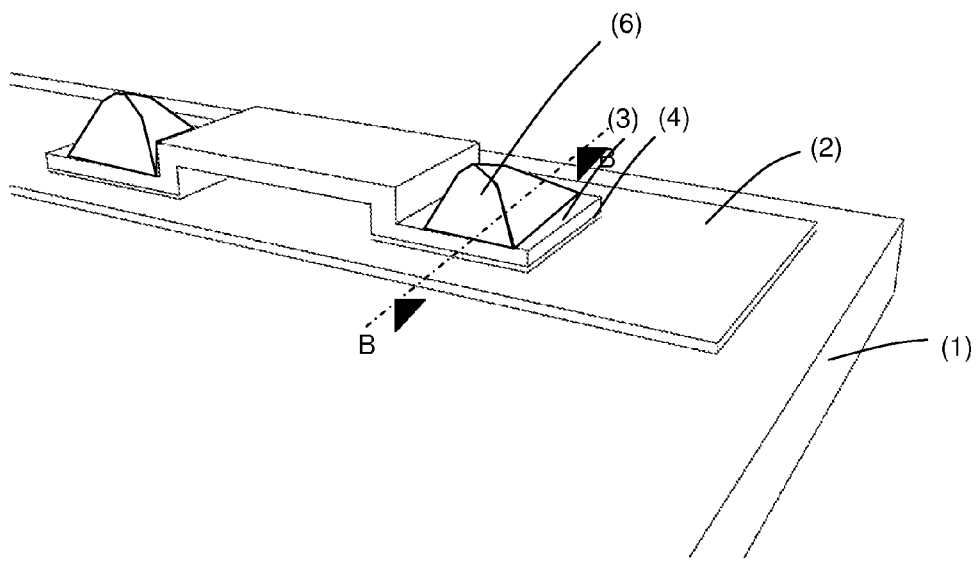
Figure 7:
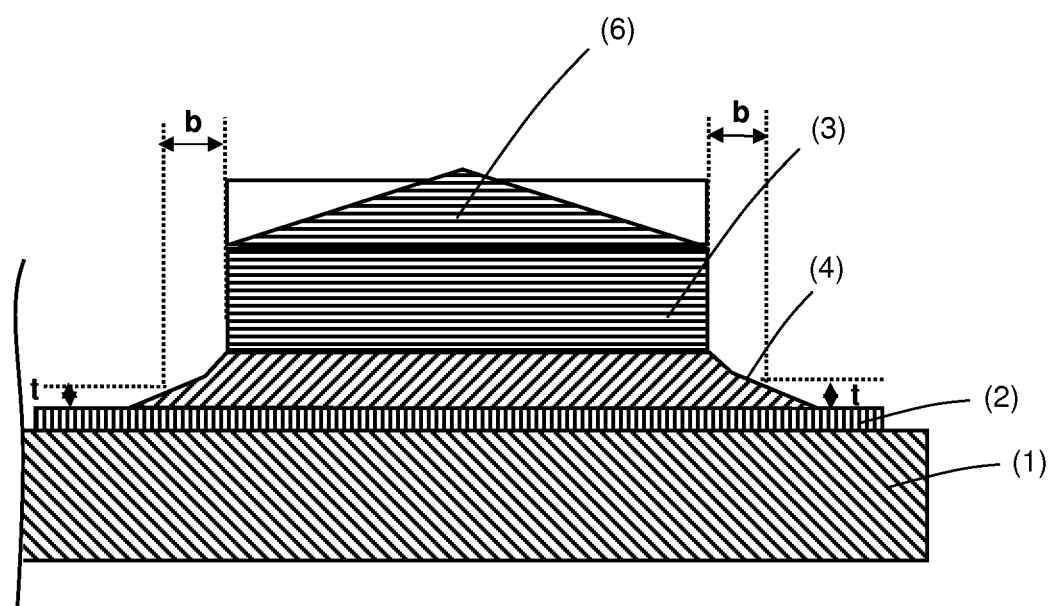

FIG. 6 and FIG. 7 depict another embodiment of the pane 1 according to the invention with connection element 3 in the form of a bridge. The connection element 3 contained an iron-containing alloy with a coefficient of thermal expansion of $8 \times 10^{-6}$/°C. The material thickness was 2 mm. In the region of the contact surface of the connection element 3 with the pane 1, hat-shaped compensation members 6 were applied with an iron-nickel-cobalt alloy. The maximum layer thickness of the hat-shaped compensation members 6 was 4 mm. By means of the compensation members, it was possible to adapt the coefficient of thermal expansion of the connection element 3 to the requirements of the pane 1 and of the solder material 4. The hat-shaped compensation members 6 resulted in improved heat flow during the production of the solder connection 4. The heating occurred primarily in the center of the contact surface. It was possible to further reduce the outflow width b of the solder material 4. Because of the low outflow width b of <1 mm and the adapted coefficient of expansion, it was possible to further reduce the thermal stresses in the pane 1. The thermal stresses in the pane 1 were noncritical, and a durable electrical and mechanical connection was provided between the connection element 3 and the pane 1 via the electrically conductive structure 2.

Figure 8:
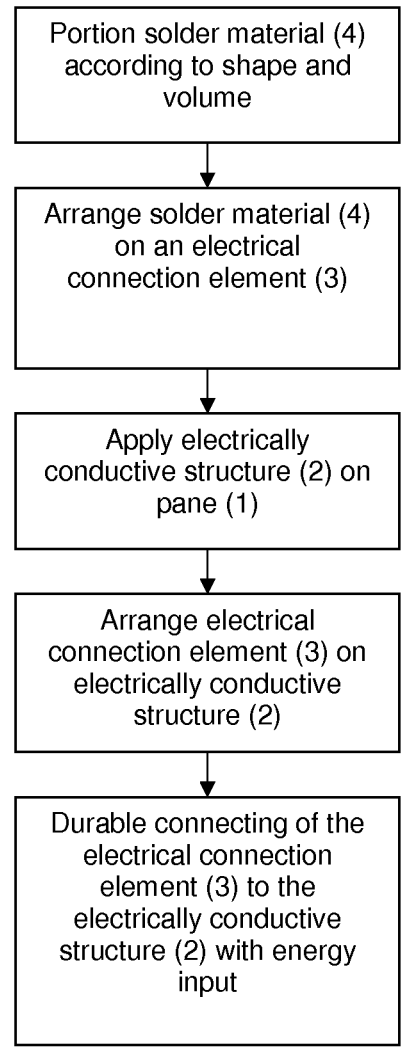

FIG. 8 depicts in detail a method according to the invention for manufacture of a pane 1 with an electrical connection element 3. An example of the method according to the invention for manufacture of a pane with an electrical connection element 3 is presented there. As the first step, it was necessary to portion the solder material 4 according to shape and volume. The portioned solder material 4 was arranged on the electrical connection element 3. The electrical connection element 3 was arranged with the solder material 3 on the electrically conductive structure 2. A durable connection of the electrical connection element 3 to the electrically conductive structure 2 and, thus, to the pane 1 took place through the input of energy.

EXAMPLE

Test specimens were produced with the pane 1 (thickness 3 mm, width 150 cm, and height 80 cm), the electrically conductive structure 2 in the form of a heating conductor structure, the electrical connection element 3, the silver layer on the contact surfaces of the connection element 3, and the solder material 4. The solder material 4 was applied in advance as a platelet with fixed layer thickness, volume, and shape on the contact surface of the connection element 3. The connection element 3 was applied with the solder material applied on the electrically conductive structure 2. The connection element was soldered onto the electrically conductive structure 2 at a temperature of 200° C. and a processing time of 2 seconds. Outflow of the solder material 4 from the intermediate space between the electrical connection element 3 and the electrically conductive structure 2, which exceeded a layer thickness t of 50 μm, was observed only to a maximum outflow width of b=0.5 mm. The dimensions and compositions of the electrically conductive structure 2, the electrical connection element 3, the silver layer on the contact surfaces of the connection element 3, and the solder material 4 are found in Table 1 and FIGS. 1 and 2 and the description of the figures.

With all specimens, it was possible to observe, with a temperature difference from +80° C. to −30° C., that no glass substrate 1 broke or showed damage. It was possible to demonstrate that, shortly after soldering, these panes 1 with the soldered connection element 3 were stable against a sudden temperature drop.

TABLE 1

| Components | Material | Example |
| --- | --- | --- |
| Connection element | Iron (wt.-%) | 65 |
| | Nickel (wt.-%) | 35 |
| | CTE (coefficient of thermal expansion) × $10^{-6}$ (0° C.-100° C.) | 1.7 |
| | Difference between CTE of the connection element and substrate × $10^{-6}$/° C. (0° C.-100° C.) | 6.6 |
| | Thickness of the connection element (m) | $8.0 \times 10^{-4}$ |
| Solderable layer | Silver (wt.-%) | 100 |
| | Thickness of the layer (m) | $7.0 \times 10^{-6}$ |
| Solder layer | Tin (wt.-%) | 42 |
| | Bismuth (wt.-%) | 57 |
| | Silver (wt.-%) | 1 |
| | Thickness of the solder layer in (m) | $250 \times 10^{-6}$ |
| | The thickness of the solderable layer and the solder layer (m) | $255 \times 10^{-6}$ |
| Glass substrate (Soda lime glass) | CTE × $10^{-6}$ (0° C.-320° C.) | 8.3 |

In addition, test specimens were executed with a second composition of the electrical connection element 3. The dimensions and compositions of the electrically conductive structure 2, the electrical connection element 3, the silver layer on the contact surfaces of the connection element 3, and the solder material 4 detailed values are found in Table 2. Here as well, it was possible to observe that, with a temperature difference from +80° C. to −30° C., no glass substrate 1 broke or showed damage. It was possible to demonstrate that, shortly after soldering, these panes 1 with the soldered connection element 3 were stable against a sudden temperature drop.

TABLE 2

| Components | Material | Example |
| --- | --- | --- |
| Connection element | Iron (wt.-%) | 54 |
| | Nickel (wt.-%) | 29 |
| | Cobalt (wt.-%) | 17 |
| | CTE (coefficient of thermal expansion) × $10^{-6}$ (0° C.-100° C.) | 5.1 |
| | Difference between CTE of the connection element and substrate × $10^{-6}$/° C. (0° C.-100° C.) | 3.2 |
| | Thickness of the connection element (m) | $8.0 \times 10^{-4}$ |
| Solderable layer | Silver (wt.-%) | 100 |
| | Thickness of the layer (m) | $7.0 \times 10^{-6}$ |
| Solder layer | Tin (wt.-%) | 40 |
| | Bismuth (wt.-%) | 57 |
| | Silver (wt.-%) | 3 |
| | Thickness of the solder layer in (m) | $250 \times 10^{-6}$ |
| | The thickness of the solderable layer and the solder layer (m) | $255 \times 10^{-6}$ |
| Glass substrate (Soda lime glass) | CTE × $10^{-6}$ (0° C.-320° C.) | 8.3 |

In addition, test specimens were executed with a second composition of the electrical connection element 3 and a second composition of the solder material 4. The dimensions and compositions of the electrically conductive structure 2, the electrical connection element 3, the silver layer on the contact surfaces of the connection element 3, and the solder material 4 detailed values are found in Table 3. Here as well, it was possible to observe that, with a temperature difference from +80° C. to −30° C., no glass substrate 1 broke or showed damage. It was possible to demonstrate that, shortly after soldering, these panes 1 with the soldered connection element 3 were stable against a sudden temperature drop.

TABLE 3

| Components | Material | Example |
| --- | --- | --- |
| Connection element | Iron (wt.-%) | 65 |
| | Nickel (wt.-%) | 35 |
| | CTE (coefficient of thermal expansion) × $10^{-6}$ (0° C.-100° C.) | 1.7 |
| | Difference between CTE of the connection element and substrate × $10^{-6}$/° C. (0° C.-100° C.) | 6.6 |
| | Thickness of the connection element (m) | $8.0 \times 10^{-4}$ |
| Solderable layer | Silver (wt.-%) | 100 |
| | Thickness of the layer (m) | $7.0 \times 10^{-6}$ |
| Solder layer | Tin (wt.-%) | 40 |
| | Bismuth (wt.-%) | 57 |
| | Silver (wt.-%) | 3 |
| | Thickness of the solder layer in (m) | $250 \times 10^{-6}$ |
| | The thickness of the solderable layer and the solder layer (m) | $255 \times 10^{-6}$ |
| Glass substrate (Soda lime glass) | CTE × $10^{-6}$ (0° C.-320° C.) | 8.3 |

Comparative Example 1

The comparative example 1 was carried out the same as the example with the following differences. The dimensions and components of the electrically conductive structure 2, the electrical connection element 3, the metal layer on the contact surfaces of the connection element 3, and the solder material 4 are found in Table 4. The solder material 4 was, in accordance with the prior art, not applied in advance as a platelet on the contact surface of the connection element 3. The connection element 3 was soldered to the electrically conductive structure 2 in accordance with the conventional method. With the outflow of the solder material 4 from the intermediate space between the electrical connection element 3 and the electrically conductive structure 2, which exceeded a layer thickness t of 50 μm, an average outflow width b=2 mm to 3 mm was obtained.

With a sudden temperature difference from +80° C. to −30° C., it was observed that the glass substrates 1 had major damage shortly after soldering.

TABLE 4

| Components | Material | Comparative Example 1 |
|---|---|---|
| Connection element | Titanium (wt.-%) | 100 |
| | CTE (coefficient of thermal expansion) × $10^{-6}$ (0° C.-100° C.) | 8.80 |
| | Difference between CTE of the connection element and substrate × $10^{-6}$/° C. (0° C.-100° C.) | 0.5 |
| | Thickness of the connection element (m) | $8.0 \times 10^{-4}$ |
| Solderable layer | Silver (wt.-%) | 100 |
| | Thickness of the layer (m) | $7.0 \times 10^{-6}$ |
| Solder layer | Tin (wt.-%) | 48 |
| | Bismuth (wt.-%) | 46 |
| | Silver (wt.-%) | 2 |
| | Copper(wt.-%) | 4 |
| | Thickness of the solder layer in (m) | $50\text{-}200 \times 10^{-6}$ |
| | The thickness of the solderable layer and the solder layer (m) | $55\text{-}205 \times 10^{-6}$ |
| Glass substrate (Soda lime glass) | CTE × $10^{-6}$ (0° C.-320° C.) | 8.3 |

Comparative Example 2

The comparative example 2 was carried out the same as the example with the following differences. The dimensions and components of the electrically conductive structure 2, the electrical connection element 3, the metal layer on the contact surfaces of the connection element 3, and the solder material 4 are found in Table 5. The solder material 4 was, in accordance with the prior art, not applied in advance as a platelet on the contact surface of the connection element 3. The connection element 3 was soldered to the electrically conductive structure 2 in accordance with the conventional method. With the outflow of the solder material 4 from the intermediate space between the electrical connection element 3 and the electrically conductive structure 2, which exceeded a layer thickness t of 50 μm, an average outflow width b=1 mm to 1.5 mm was obtained.

With a sudden temperature difference from +80° C. to −30° C., it was observed that the glass substrates 1 had major damage shortly after soldering.

TABLE 5

| Components | Material | Comparative Example 2 |
|---|---|---|
| Connection element | Copper (wt.-%) | 100 |
| | CTE (coefficient of thermal expansion) × $10^{-6}$ (0° C.-100° C.) | 16 |
| | Difference between CTE of the connection element and substrate × $10^{-6}$/° C. (0° C.-100° C.) | 7.7 |
| | Thickness of the connection element (m) | $8.0 \times 10^{-4}$ |
| Solderable layer | Silver (wt.-%) | 100 |
| | Thickness of the layer (m) | $7.0 \times 10^{-6}$ |
| Solder layer | Tin (wt.-%) | 71.5 |
| | Indium (wt.-%) | 24 |
| | Silver (wt.-%) | 2.5 |
| | Bismuth (wt.-%) | 1.5 |
| | Copper (wt.-%) | 0.5 |
| | Thickness of the solder layer in (m) | $50\text{-}200 \times 10^{-6}$ |
| | The thickness of the solderable layer and the solder layer (m) | $55\text{-}205 \times 10^{-6}$ |
| Glass substrate (Soda lime glass) | CTE × $10^{-6}$ (0° C.-320° C.) | 8.3 |

It was demonstrated that panes according to the invention with glass substrates 1 and electrical connection elements 3 according to the invention have better stability against sudden temperature differences. This result was unexpected and surprising for the person skilled in the art.

LIST OF REFERENCE CHARACTERS (1) Pane/glass
(2) Electrically conductive structure/Ag-screenprint
(3) Electrical connection element/Fe—Ni alloy kovar
(4) Solder material (Bi40Sn57Ag3)
(5) Wetting layer/Ag-coating
(6) Compensation member
b Maximum outflow width of the solder material
t Limiting thickness of the solder material
A-A' Section line
B-B' Section line

The invention claimed is:

1. A pane, comprising:
    a substrate made of glass having a first coefficient of thermal expansion, an electrically conductive structure with a layer thickness of 5 μm to 40 μm on a region of the substrate;
    a connection element having a second coefficient of thermal expansion, wherein the difference between the first coefficient of expansion and the second coefficient of expansion is ≥5×$10^{-6}$/° C.; and
    a layer of a solder material electrically connecting the connection element to subregions of the electrically conductive structure,
    wherein the connection element comprises 50 wt.-% to 75 wt.-% iron, 25 wt.-% to 50 wt.-% nickel, 0 wt.-% to 20 wt.-% cobalt, 0 wt.-% to 1.5 wt.-% magnesium, 0 wt.-% to 1 wt.-% silicon, 0 wt.-% to 1 wt.-% carbon, and 0 wt.-% to 1 wt.-% manganese.

2. The pane according to claim 1, wherein the second coefficient of thermal expansion is ≤4×$10^{-6}$/° C.

3. The pane according to claim 1, wherein a maximum outflow width b in an intermediate space formed by the connection element and the electrically conductive structure is pulled back into a concave meniscus.

4. The pane according to claim 1, wherein the electrically conductive structure has a layer thickness of 8 μm to 15 μm.

5. The pane according to claim 1, wherein the electrically conductive structure comprises silver.

6. The pane according to claim 1, wherein the layer thickness of the solder material is $<3.0 \times 10^{-4}$.

7. The pane according to claim 1, wherein the solder material contains elements selected from the group consisting of: tin and bismuth, indium, zinc, copper, silver, or compositions thereof.

8. The pane according to claim 7, wherein the proportion of tin in the solder material is 3 wt.-% to 99.5 wt.-%.

9. The pane according to claim 7, wherein a proportion of bismuth, indium, zinc, copper, silver, or compositions thereof in the solder material is 0.5 wt.-% to 97 wt.-%.

10. The pane according to claim 1, wherein the connection element comprises at least 55 wt.-% to 70 wt.-% iron, 30 wt.-% to 45 wt.-% nickel, 0 wt.-% to 5 wt.-% cobalt, 0 wt.-% to 1 wt.-% magnesium, 0 wt.-% to 1 wt.-% silicon, or 0 wt.-% to 1 wt.-%.

11. The pane according to claim 1, wherein the connection element is coated with nickel, tin, copper, and/or silver.

12. The pane according to claim 11, wherein the connection element is coated with 0.1 μm to 0.3 μm nickel and/or 3 μm to 10 μm silver.

13. A method for production of the pane with an electrical connection element according to claim 1, the method comprising:

arranging and applying a solder material on the connection element as a platelet with a fixed layer thickness, volume, shape, and arrangement;

applying an electrically conductive structure on a substrate;

arranging the connection element with a solder material on the electrically conductive structure; and soldering the connection element to the electrically conductive structure.

14. A method comprising: using the pane with an electrical connection element according to claim 1 for motor vehicles with electrically conductive structures.

15. The pane according to claim 1, further comprising a coating containing between the layer of solder material and the connection element, wherein the coating containing silver prevents the solder material from spreading to the connection element.

16. The pane according to claim 1, wherein the connection element has a recessed portion on a side facing the electrically conductive structure, the recessed portion adapted to contain the solder material and prevent outflow of the solder material.

17. The pane according to claim 1, wherein edge regions of the connection element are bent upward, the solder material being formed in a space formed between the bent edge regions and the electrically conductive structure.

18. A method comprising: using the pane according to claim 1 with heating conductors and/or antenna conductors.

* * * * *